(No Model.) 2 Sheets—Sheet 2.
S. HAINKEL.
STRAP BEVELING MACHINE.
No. 443,519. Patented Dec. 30, 1890.
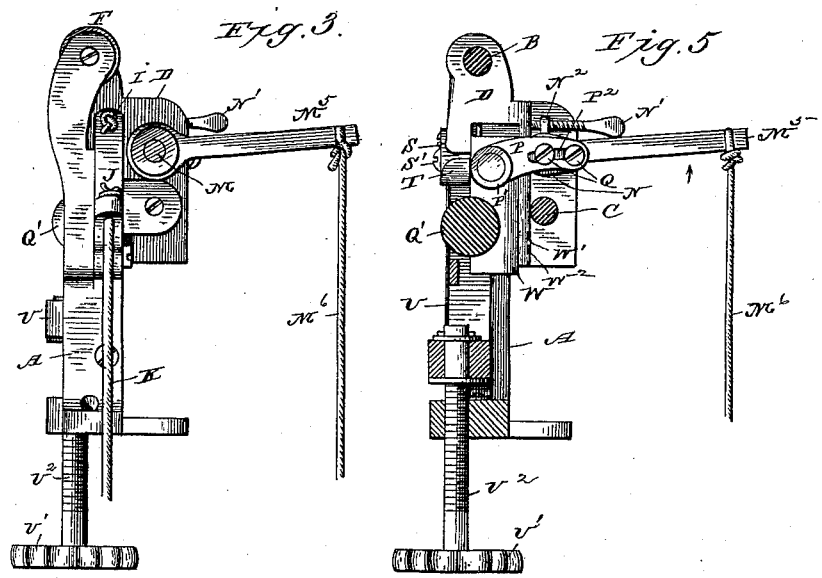
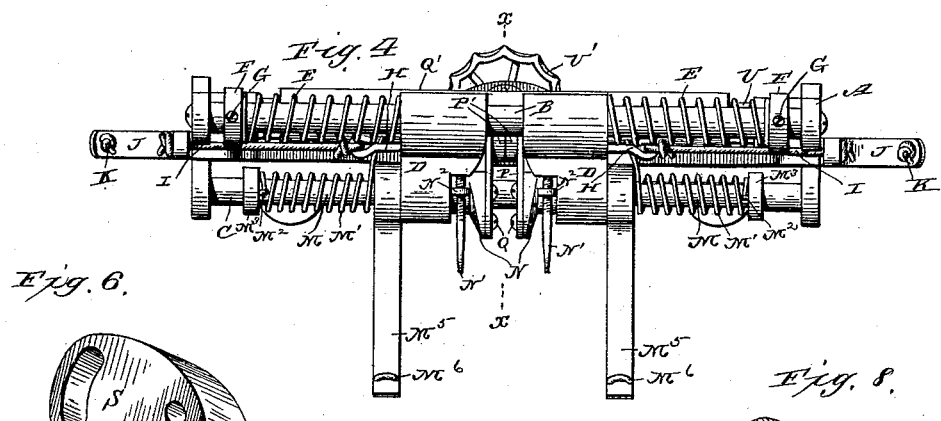
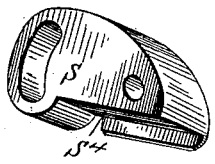
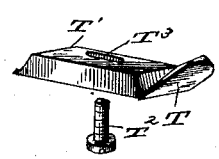
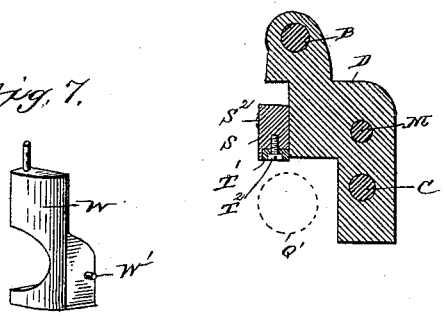
Witnesses
E. D. Smith
Thomas Durant
Inventor
Sigel Hainkel,
By his Attorneys
Church & Church
THE NORRIS PETERS CO., PHOTO-LITHO., WASHINGTON, D. C.

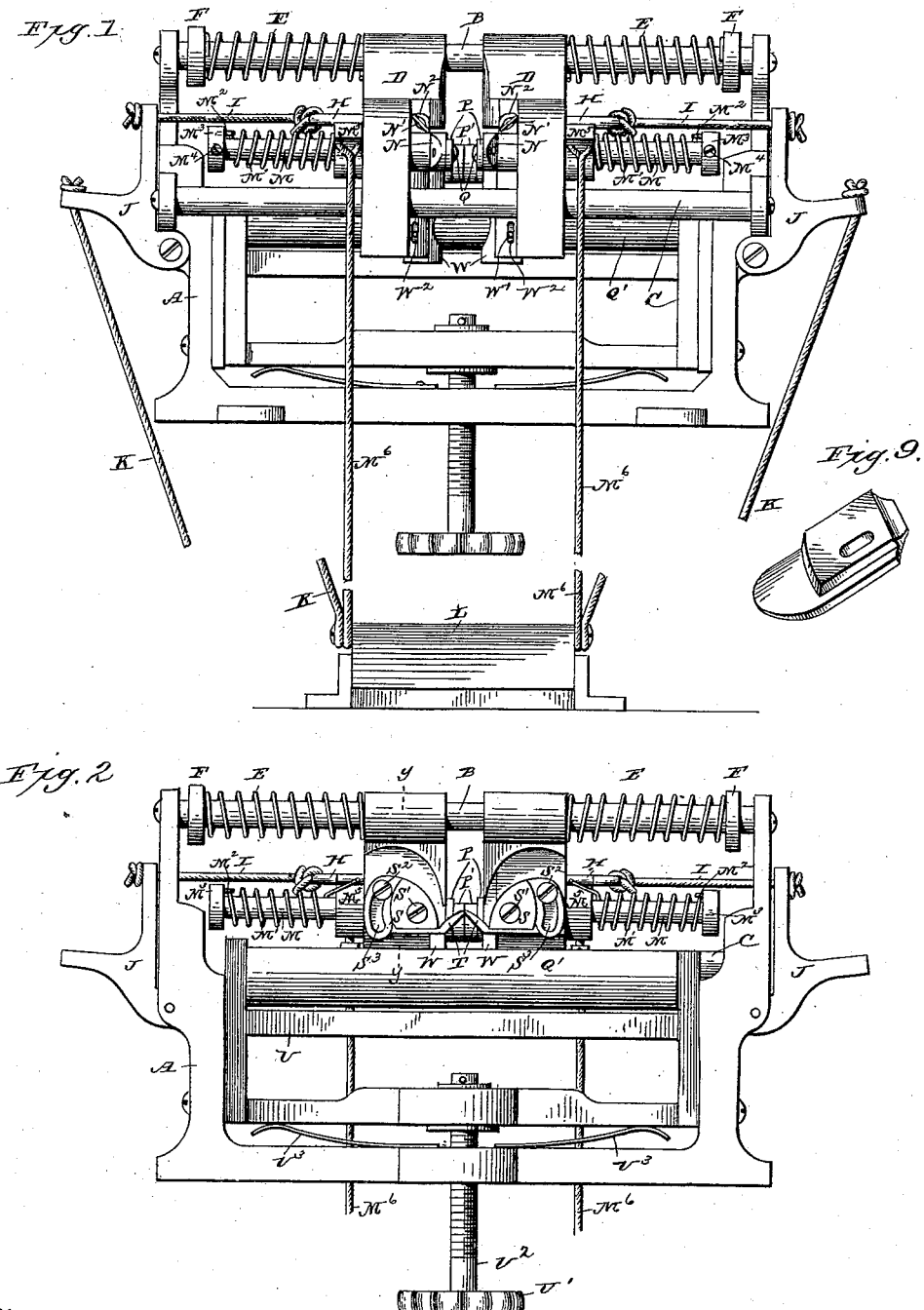

UNITED STATES PATENT OFFICE.

SIGEL HAINKEL, OF QUINCY, ILLINOIS.

STRAP-BEVELING MACHINE.

SPECIFICATION forming part of Letters Patent No. 443,519, dated December 30, 1890.

Application filed January 31, 1890. Serial No. 338,731. (No model.)

*To all whom it may concern:*

Be it known that I, SIGEL HAINKEL, of Quincy, in the county of Adams and State of Illinois, have invented certain new and useful Improvements in Machines for Beveling the Edges of Harness-Straps; and I do hereby declare the following to be a full, clear, and exact description of the same, reference being had to the accompanying drawings, forming a part of this specification, and to the letters of reference marked thereon.

My invention has for its object to provide a machine for beveling the edges of harness-straps which shall be adapted to operate upon straps of varying width and thickness, and which within certain limits shall adjust itself to the article being operated upon, whether the latter be cut straight, scalloped, or tapered; and it consists in certain novel details of construction and combinations of parts which will be hereinafter fully described, and pointed out specifically in the claims at the end of this specification.

In the accompanying drawings, Figure 1 represents a front view of a machine embodying my invention; Fig. 2, a rear view of the same; Fig. 3, an end view; Fig. 4, a top view; Fig. 5, a sectional view taken on the line $x\ x$, Fig. 4; Fig. 6, a perspective view of one of the beveling-knives and its holder detached; Fig. 7, a detail view of one of the guards or gages. Fig. 8 is a detail sectional view taken on the line $y\ y$, Fig. 2. Fig. 9 is a detail view of a modified form of knife.

Similar letters of reference in the several figures indicate the same parts.

The letter A represents the main frame of the machine, which is adapted to be secured by bolts or otherwise to a suitable bench or work-table.

B and C are two bars, preferably of cylindrical form, extending from side to side of the frame of the machine, substantially parallel to each other. Mounted upon these bars so as to slide freely are two heads or blocks D D, said heads being kept pressed toward each other by means of coiled springs E, mounted upon the upper cross-bar B, between the said heads D, and adjustable collars F, secured to said bar B at the desired points by set-screws G. Each of these heads D has a suitable eye H secured to its outer side near its middle, and from this eye extends a cord or rod I, that is connected to the upper arm of a bell-crank lever J, pivoted on the end of the frame. To the lower arm of this bell-crank lever is connected another similar cord or rod K, that in turn is attached to a foot lever or treadle L beneath the bench. When pressure is brought to bear upon this treadle, the heads D D are drawn apart and the springs E E are further compressed, and when the treadle is released the said heads are caused to again approach each other.

Mounted in each of the heads D is a rock-shaft M, having upon its inner end a head N, to which is secured by set-screws Q an arm P, carrying a friction-roller P'. The said arm P is slotted where the set-screws Q pass through, as seen at $P^2$, to permit of the arm being adjusted out or in, as desired.

Upon the outer portion of each rock-shaft M is mounted a spiral spring M', the same bearing at its inner end against the eye H of the head D and connected at its outer end to a projection $M^2$ on an adjustable collar $M^3$, mounted upon the rock-shaft and secured to it by means of a set-screw $M^4$. By turning the collar $M^3$ and then securing it fast to the rock-shaft by the set-screw the spring M' is put under compression and tends to turn the rock-shaft in the direction indicated by the arrow in Fig. 5, and to thereby force the friction-rollers P' on the arm P down toward a large roller Q'; but said friction-roller P' is prevented from coming in contact with the said large roller Q' by the impingement of a limiting-screw N', threaded through an offset $N^2$ of head N of the rock-shaft, against the side of the head D, as shown in Figs. 4 and 5. Securely fastened to each of the rock-shafts M, near the head D, is a forwardly-projecting arm $M^5$, to the outer end of which a strap or other suitable connection $M^6$, extending down to the treadle L, is secured. When the treadle is depressed, therefore, not only are the heads D D separated, but the rock-shafts M are rocked and the friction-rollers P' are lifted up out of the way, thus permitting the strap to be operated upon to be inserted between the said heads D D and beneath the rollers P' without obstruction from any quarter.

On the rear side of each of the heads D is secured by screws S' and S² an adjustable socket or holder S for the beveling-knife T, as shown in Fig. 2. The screw S' serves as the pivot of the knife-holder, while the screw S², which passes through a curved slot S³ in said holder, serves as a means for securing the holder when the latter is turned to that position which will cause the edge of its knife T to be brought to the angle desired. The connection between the knife and its holder is best shown in Fig. 2. Upon examining this figure it will be seen that the shank of the knife is provided with a projection T' on its upper side, which is adapted to enter a corresponding recess S⁴ in the holder, and thus give the knife lateral steadiness. Furthermore, that an elongated opening T³ is made in the shank of the knife, through which the screw T², which secures the knife to the holder, passes. By manipulating this screw T² the knife may be adjusted longitudinally forward or backward, and the amount of the material cut from the edge of the strap be thus regulated.

The large roller Q', which has been hereinbefore alluded to, constitutes the support upon which the strap rests while being operated upon. It is mounted in a vertically-adjustable sliding frame U, and is moved up and down nearer to or farther from the knife-holders, accordingly as the strap being operated upon is a thin or thick one, by means of a hand-wheel and screw-shaft U' and U², as shown in Figs. 1 and 2. Flat or leaf springs U³ are preferably arranged beneath this frame U, in order that the pressure upon the roller may not have to be sustained wholly by the screw-shaft.

W W are guards or gages applied to the proximate faces of the heads D. Each of them is set into the face of the head D, to which it is connected, and is provided with a pin W', which enters a guide-slot W² in said head, as shown in Figs. 1 and 5, and each of them is shaped so as to partially embrace the bearing-roller Q', and move with said roller when it is adjusted up or down by the manipulation of the hand-wheel and screw-shaft U' U².

From the preceding description it is believed that the operation of the machine will be readily understood. It is as follows: To open the machine to receive the strap, the operator presses with his foot upon the treadle L, which causes the heads D D, carrying the cutters or knives T T and the pressure-rollers P' P' and guards or gages W W, to be drawn apart, and also causes the said friction-rollers P' P' to be raised. The strap to be operated upon is now thrust in upon the roller Q' and between the heads D D, whereupon the treadle is released so as to permit the heads to approach each other and their guards or gages W W to press against the edges of the strap and at the same time allow the friction-rollers P' P' to bear with pressure upon the top of the strap and hold it yieldingly upon the roller Q'. As the strap is now held the knives or cutters are in advance of it and in position for action, and upon the strap being drawn forward the knives operate to bevel the edges of the same, as will be readily understood. The angle at which the knives operate is regulated by the adjustment of the holders, as hereinbefore described. As the strap proceeds through the machine, the heads D D accommodate themselves to its varying width and the spring-pressed friction-rollers P' P' in like manner accommodate themselves to any variations in the thickness of the strap. Where very wide straps are operated upon, the collars F on the cross-bar B are adjusted outward, in order to give the heads D D a greater range of movement, and where narrow straps are to be acted upon said collars F are adjusted inward and secured by their set-screws. As the straps acted on are thin or thick ones, the large supporting-roller Q' is adjusted higher or lower by the hand-wheel and screw-shaft U' U², as before explained, and the nearness with which the friction-rollers P' P' are permitted to approach the said roller Q' is regulated by the adjustment of the limiting-screws N' N'. A channeling-knife—such as shown in Fig. 9—may be substituted for the beveling-knife when it is desired to form a channel in the strap instead of a bevel upon it.

It is obvious that one or both of the knives may be used in the machine and that different knives may be employed upon the two heads D D, so as to act differently on opposite edges of the strap.

Having thus described my invention, what I claim as new is—

1. In a machine such as described, the combination, with the main frame having the two guide-rods mounted rigidly therein, and the laterally-movable heads carrying the cutting-knives mounted on said rods, of the springs surrounding the rods and bearing against the heads to hold them together, substantially as described.

2. In a machine such as described, the combination, with the laterally-movable heads bearing the knives, of the rods on which said heads are mounted, the springs for forcing said heads toward each other, and the treadle and intermediate connections between the treadle and each of the heads for separating the heads to admit the strap between them, substantially as described.

3. In a machine such as described, the combination, with the adjustable heads having the knives thereon, of the rock-shafts mounted in said heads, the friction-rollers carried by said rock-shafts, and the springs applied to said rock-shafts, substantially as described.

4. In a machine such as described, the combination, with the heads having the knives thereon and the rock-shafts mounted therein, of the friction-rollers carried by said rock-shafts, the springs for turning the rock-shafts, and the adjustable collars for regulating the tension of said springs, substantially as described.

5. In a machine such as described, the combination of the head having the knives thereon, the rock-shafts mounted therein carrying the friction pressure-rollers, the springs for turning said shafts, and the limiting-screw for limiting the extent of movement of said shafts, substantially as described.

6. In a machine such as described, the combination of the adjustable heads, their guides and actuating-springs, and the knives on said heads, the rock-shafts mounted in said heads and carrying the friction pressure-rollers, springs for actuating said rock-shafts, the arms or levers connected to said rock-shafts, and the treadle and connections by which the heads are separated and at the same time the pressure-rollers are raised, substantially as described.

7. In a machine such as described, the combination of the laterally-adjustable heads with the independent vertically-movable guards or gages for the edges of the strap carried thereby, the large adjustable supporting-roller with which said guards or gages co-operate, and the knives on the heads, substantially as described.

8. In a machine such as described, the combination of the laterally-adjustable heads carrying the knives, the guards or gages journaled in the heads, and the pressure friction-rollers carried thereby, and the co-operating supporting-roller over which the strap passes, substantially as described.

9. In a machine such as described, the combination of the laterally-adjustable spring-pressed heads, the independently-movable spring-pressed friction-rollers carried thereby, and the cutting-knives, substantially as described.

10. In a machine such as described, the combination, with the laterally-adjustable spring-pressed heads, the independently-movable spring-pressed friction-rollers, and the independently-movable guards or gages and the cutting-knives carried thereby, of the large supporting-roller, substantially as described.

SIGEL HAINKEL.

Witnesses:
L. E. EMMONS,
L. E. EMMONS, Jr.